US012400851B2

(12) United States Patent
Lehmann et al.

(10) Patent No.: US 12,400,851 B2
(45) Date of Patent: Aug. 26, 2025

(54) HYBRID MASS SPECTROMETRY APPARATUS

(71) Applicant: Analytic Jena GmbH+Co. KG, Jena (DE)

(72) Inventors: Roland Lehmann, Jena (DE); Iouri Kalinitchenko, Jena-Maua (DE)

(73) Assignee: Analytik Jena GmbH+Co. KG, Jena (DE)

( * ) Notice: Subject to any disclaimer, the term of this patent is extended or adjusted under 35 U.S.C. 154(b) by 419 days.

(21) Appl. No.: 17/663,085

(22) Filed: May 12, 2022

(65) Prior Publication Data

US 2022/0367169 A1 Nov. 17, 2022

(30) Foreign Application Priority Data

May 12, 2021 (EP) .................................... 21173705

(51) Int. Cl.

| | |
|---|---|
| ***H01J 49/42*** | (2006.01) |
| ***H01J 49/00*** | (2006.01) |
| ***H01J 49/10*** | (2006.01) |
| ***H01J 49/40*** | (2006.01) |

(52) U.S. Cl.

CPC ...... *H01J 49/4215* (2013.01); *H01J 49/0027* (2013.01); *H01J 49/105* (2013.01); *H01J 49/40* (2013.01)

(58) Field of Classification Search

CPC ...... H01J 49/04; H01J 49/009; H01J 49/0045; H01J 49/063; H01J 49/40; H01J 49/4215; H01J 49/4225

See application file for complete search history.

(56) References Cited

U.S. PATENT DOCUMENTS

| | | | |
|---|---|---|---|
| 5,559,337 | A | 9/1996 | Ito et al. |
| 5,773,823 | A | 6/1998 | Ito et al. |
| 5,804,821 | A | 9/1998 | Nakagawa |
| 6,031,579 | A | 2/2000 | Stephenson |
| 6,614,021 | B1 | 9/2003 | Kalinitchenko |
| 6,630,665 | B2 | 10/2003 | Tanner et al. |
| 6,815,667 | B2 | 11/2004 | Tanner et al. |

(Continued)

FOREIGN PATENT DOCUMENTS

| | | | |
|---|---|---|---|
| CN | 105531794 | A1 | 4/2016 |
| CN | 108028168 | A1 | 5/2018 |

(Continued)

*Primary Examiner* — David E Smith
*Assistant Examiner* — Hsien C Tsai
(74) *Attorney, Agent, or Firm* — Christopher R. Powers; Endress+Hauser (USA) Holding, Inc.

(57) ABSTRACT

The present disclosure includes a mass spectrometry apparatus for analyzing an analyte sample, which comprises: an ion source from which a quantity of analyte ions from the analyte sample may be sourced for providing an ion beam; a mass analyzer serving to filter the analyte ions of the ion beam based on their mass-to-charge ratio; a first detector unit for analyzing the ions of the ion beam; and a second detector unit being based on the time-of-flight principle and comprising a second detector for analyzing the ions of the ion beam. The present disclosure further includes a method for analyzing an analyte sample using a mass spectrometry apparatus according to the present disclosure.

14 Claims, 3 Drawing Sheets

(56) References Cited

U.S. PATENT DOCUMENTS

| | | | | |
|---|---|---|---|---|
| 7,034,292 | B1 * | 4/2006 | Whitehouse .......... | H01J 49/004 250/281 |
| 7,119,330 | B2 | 10/2006 | Kalinitchenko | |
| 7,329,863 | B2 | 2/2008 | Kalinitchenko | |
| 2002/0145109 | A1 | 10/2002 | Doroshenko | |
| 2016/0026747 | A1 | 1/2016 | Garaas et al. | |
| 2018/0269046 | A1 | 9/2018 | Moellers | |

FOREIGN PATENT DOCUMENTS

| | | | |
|---|---|---|---|
| DE | 202020106423 | U1 | 2/2021 |
| WO | 2012100299 | A1 | 8/2012 |
| WO | 2017176131 | A1 | 10/2017 |

* cited by examiner

HYBRID MASS SPECTROMETRY APPARATUS

CROSS-REFERENCE TO RELATED APPLICATION

The present application is related to and claims the priority benefit of European Patent Application No. 21173705.1, filed May 12, 2021, the entire contents of which are incorporated herein by reference.

TECHNICAL FIELD

The present disclosure concerns a mass spectrometry apparatus for analyzing an analyte sample as well as a method for analyzing an analyte sample by a mass spectrometry apparatus.

BACKGROUND

The analysis and/or characterization of analyte samples by means of mass spectrometry today is widely used in a wide variety of fields. Numerous different types of mass spectrometers have become known from the prior art, such as sector field, quadrupole, or time-of-flight mass spectrometers, or also mass spectrometers with inductively coupled plasma. The modes of operation of the various mass spectrometers have been described in numerous publications and are therefore not explained in detail here.

In a mass spectrometer, the molecules or atoms of the analyte sample are first transferred into the gas phase and ionized. For ionization, various methods known from the state of the art are available, such as inductively coupled plasma ionization (ICP), impact ionization, electron impact ionization, chemical ionization, photoionization, field ionization, or so-called fast atom bombardment, matrix-assisted laser desorption/ionization or electrospray ionization.

After ionization, the ions pass through an analyzer, also known as a mass analyzer, in which they are separated according to their mass-to-charge ratio m/z. Different types of analyzers and modes of operation are based, for example, on the application of static or dynamic electric and/or magnetic fields or on different times of flight of different ions. In particular, different types of mass analyzers include single, multiple or hybrid arrangements of analyzers, such as quadrupole, triple-quadrupole, time-of-flight (TOF), ion trap, Orbitrap or magnetic sector.

The separated ions are guided towards a detector that, e.g., is one of a photo-ion multiplier, ion-electron multiplier, Faraday collector, Daly detector, microchannel plate or a channeltron.

Typically, the components of a mass spectrometer are combined depending on the involved purpose and involve the choice of the best suited detector in the end region of the mass spectrometry apparatus to detect the targeted ions. Such detector can be arranged subsequent to a single mass analyzer or more than one mass analyzer in case of a hybrid mass spectrometry apparatus. Hybrid mass spectrometry devices combine different performance characteristics offered by different types of mass spectrometers in one single device. Hybrid mass spectrometry devices are, e.g., known in the form of a quadrupole and TOF mass analyzer (Q/TOF), a quadrupole and an ion trap (Q-Trap), a linear ion trap and an Orbitrap (LTQ-Orbitrap) or a quadrupole and an orbitrap mass analyzer.

Inductively coupled plasma mass spectrometers (ICP-MS), e.g., involve the complete atomization and subsequent ionization of the test sample by means of a plasma source before the resulting elemental ions are quantified by the spectrometer. In this regard, quadrupole mass filters are frequently used which is due to a superior dynamic range and sensitivity, but also due to their robustness and high analysis speed. However, several applications, e.g., the detection of nano particles, laser ablation or tissue imaging require parallel mass spectra obtained by a time-of-flight (TOF) or quadrupole time-of-flight (Q/TOF) based devices, which provide a comparably higher detection speed and simultaneous mass range coverage. On the other hand, such devices comprise a significantly lower dynamic range, less sensitivity and increased system costs compared to solely quadrupole bases mass spectrometry devices. Therefore, it would be desirable to combine advantages of the two different types of mass spectrometry devices to improve the analyzing capabilities.

Today, this is generally achieved by either the ability to make use of certain aspects and features of various hybrid approaches or by utilizing two separate devices. These current solutions are either unable of benefiting of the entire idea underlying the hybrid approach or are ineffective and expensive. Therefore, it is an object of the present disclosure to provide a hybrid mass spectrometry device that allows for comprehensive characterization of analyte samples.

SUMMARY

This object is achieved by the mass spectrometry apparatus and by the method of operating a mass spectrometry apparatus according to the present disclosure.

With regards to the mass spectrometry apparatus the object is achieved by a mass spectrometry apparatus for analyzing an analyte sample, comprising an ion source from which a quantity of analyte ions from the analyte sample may be sourced for providing an ion beam, a mass analyzer serving to filter the analyte ions of the ion beam based on their mass-to-charge ratio, a first detector unit for analyzing the ions of the ion beam and a second detector unit being based on the time-of-flight principle and comprising a second detector for analyzing the ions of the ion beam.

The present disclosure thus provides a hybrid mass spectrometry device incorporating two different and separate detector units which advantageously can serve for different purposes. That way, usage of two different separate mass spectrometry devices for different aspects regarding a sample characterization are combined in one single instrument saving space and costs and leading to a highly compact and versatile instrument.

With respect to the present disclosure several different types of ion sources can be utilized, e.g., the ion source can be an inductively coupled plasma ion source, an ion source comprising a microwave generator, in particular a microwave generator comprising a dielectric resonator as, e.g., described in DE 202020106423 U1, US 2016/0026747 A1, or WO 2017/176131 A1, a spark source, a laser source or a glow discharge source.

In one embodiment of the mass spectrometry apparatus the first detector unit comprises a quadrupole detector. A quadrupole detector is advantageous in that it is fully tunable and comprises a high sensitivity and dynamic range. In contrast, the TOF-detector used as the second detector unit is characterized by a high acquisition speed. Accordingly, such combination combines the advantages of both types of detector units.

In another embodiment of the mass spectrometry apparatus, the second detector is a quadrupole in filter or detector.

Such quadrupole ion filters are known in the field of Q/TOF mass spectrometry devices. Thus, the second detector unit is a Q/TOF detector unit.

In one embodiment, the mass analyzer is a quadrupole mass analyzer. The mass analyzer is preferably arranged between the ion source and the first and second detector units such that the ion beam passes the mass analyzer independent of which detector unit is used for subsequent detection.

With regards to the mass analyzer, the mass analyzer may include at least one transfer optics, e.g., a Brubaker-prefilter or Brubaker lens, positioned in front of the mass analyzer and serves for guidance of the ions of the ion beam into the mass analyzer, increasing the transmission rate of ions of the ion beam through the mass analyzer.

In a further embodiment, the mass spectrometry apparatus comprises at least two mass analyzers. One mass analyzer may be arranged between the ion source and the first and second detector units. Another mass analyzer may be arranged between the first mass analyzer and the second detector of the second detector unit, e.g., a time-of-flight mass analyzer. This mass analyzer may also be part of the second detector unit. Yet, another mass analyzer may be arranged between the first mass analyzer and the first detector of the first detector unit, which also can be part of the first detector unit.

In a further embodiment, a first mass analyzer arranged between the ion source and the first and second detector units and an additional mass analyzer being arranged between the first mass analyzer and the first detector are both quadrupole mass analyzers, and the first and second detectors are both quadrupole detectors. That way, the measurement sensitivity regarding the first detector unit can be further increased.

Further, the second detector unit may comprise a time-of-flight mass analyzer arranged between the first mass analyzer and the second detector unit.

One embodiment comprises that the first detector unit is arranged parallel to a first plane and the second detector unit is arranged parallel to a second plane, the first and the second plane having a predefined angle to each other, and wherein the mass spectrometry apparatus is configured to guide the ion beam received from the mass analyzer to the first or second detector unit.

In another embodiment, the mass spectrometry apparatus further comprises at least one first guiding optics, e.g., an ion guide or ion optics, arranged and/or configured so as to guide the ion beam received from the mass analyzer into a first flow direction parallel to the first plane and/or along a second flow direction parallel to the second plane.

Further embodiments can comprise that the guiding optics comprises at least a first and a second guiding optics unit, the first guiding optics unit being configured to guide the ion beam received from the mass analyzer into the first flow direction and the second guiding optics unit being configured to guide the ion beam received from the mass analyzer into the second flow direction.

The guiding optics may include any arrangement capable of deflecting a quantity of ions between two non-parallel planes, e.g., ion mirrors, reflectors, deflectors, quadrupole ion deflectors, electrostatic energy analyzers, magnetic ion optics, or ion multiple guides. However, it is of advantage if the guiding optics comprises at least one electrode and/or lens arrangement or an ion mirror. For instance, an electrode arrangement can be embodied in the form of push- and/or pull-electrodes, and a lens arrangement can be embodied based on electric and/or magnetic field manipulation. In case of an ion mirror, on the other hand, reference is made to U.S. Pat. Nos. 6,614,021, 5,559,337, 5,773,823, 5,804,821, 6,031,579, 6,815,667, 6,630,665, or 6,6306,651.

With regards to the guiding optics it is further of advantage if the mass spectrometry apparatus, in particular the guiding optics, further comprises switching means for switching at least one component of the guiding optics between a first state in which the ion beam is guided or directed into the first flow direction and a second state in which the ion beam is guided directed into the second flow direction. For instance, an electric or magnetic field can be switched, e.g., by means of a switching voltage applied to the at least one component.

The guiding optics may be arranged between the mass analyzer, e.g., the first mass analyzer, and the first and second detector unit. Thus, the guiding optics is arranged such that it receives the ion beam from the mass analyzer and redirects the ion beam into the first or second flow direction.

In a further embodiment, the first and second detector units are arranged in the first and second flow directions respectively. Accordingly, the guiding optics is embodied to guide the ion beam to the first or second detector unit.

Regarding the arrangement of the first and second detector unit and the first and second flow direction, several different options are feasible which all fall within the scope of the present disclosure.

In one embodiment, the first plane and thus the first flow direction is parallel to a longitudinal axis of the mass analyzer.

In another embodiment the first plane and the second plane and thus the first and second flow direction are orthogonal to each other. Nonetheless, also other angles between the first and second flow direction can be provided. In particular, the first and second flow direction can also be anti-parallel to each other.

One embodiment comprises, that the apparatus further comprises at least one collisional cell arranged between the mass analyzer and the first and second detector unit.

In another embodiment, the mass spectrometry apparatus further comprises at least one second guiding optics arranged so as to divert the ion beam provided by the ion source flowing along a first initial flow direction to flow along to a second initial flow direction, the initial first and second flow directions having a predefined angle, e.g., being orthogonal, to each other, so as to minimize the effective footprint of the apparatus. The second initial flow direction is preferably parallel to a longitudinal axis of the mass analyzer. Regarding this embodiment, reference is made to WO2012/100299A1.

The object underlying the present disclosure is further achieved by a method for analyzing an analyte sample by a mass spectrometry apparatus according to the present disclosure, the method comprising the steps of: recording at least one first mass spectrum with the first detector unit; recording at least one second mass spectrum with the second detector unit; and analyzing, by combining, the first and second mass spectrum.

The first and second spectra recorded with the first and second detector units can be recorded alternately or depending on the current purpose or need. Several possibilities are feasible for combining the spectra of the different detectors, which all fall within the scope of the present disclosure.

For instance, the TOF detector can be used to record a spectrum of a full mass range of interest followed by high resolution, high sensitivity and/or high dynamic range spectra of particular smaller mass ranges, or the other way around.

Such combination of two separate, independently and interleaved working detector units enables for a comprehensive characterization of a wide variety of analyte samples, e.g., complex samples, in particular samples about which no prior knowledge is available, nanoparticle detection, laser ablation or tissue imaging. Different substances can be detected with the different detector units. The TOF detector can be utilized for a detection of isotopes in the analyte sample while the first detector unit can be used for different targets. It is possible to settle the recording scheme of the different detector units prior to use. On the other hand, the rules for selecting one specific detector unit can also be modified or defined during use. It also possible to provide algorithms for choosing one of the two detector units at a certain point of time, in particular such algorithms can be self-learning algorithms.

It shall be noted that the embodiments described in connection with the apparatus are mutatis mutandis also applicable for the method and vice versa.

BRIEF DESCRIPTION OF THE DRAWINGS

The present disclosure as well as its preferred embodiments will be further explained based on the figures, which include.

In the figures, same elements are provided with the same reference numbers.

DETAILED DESCRIPTION

Figure 1:
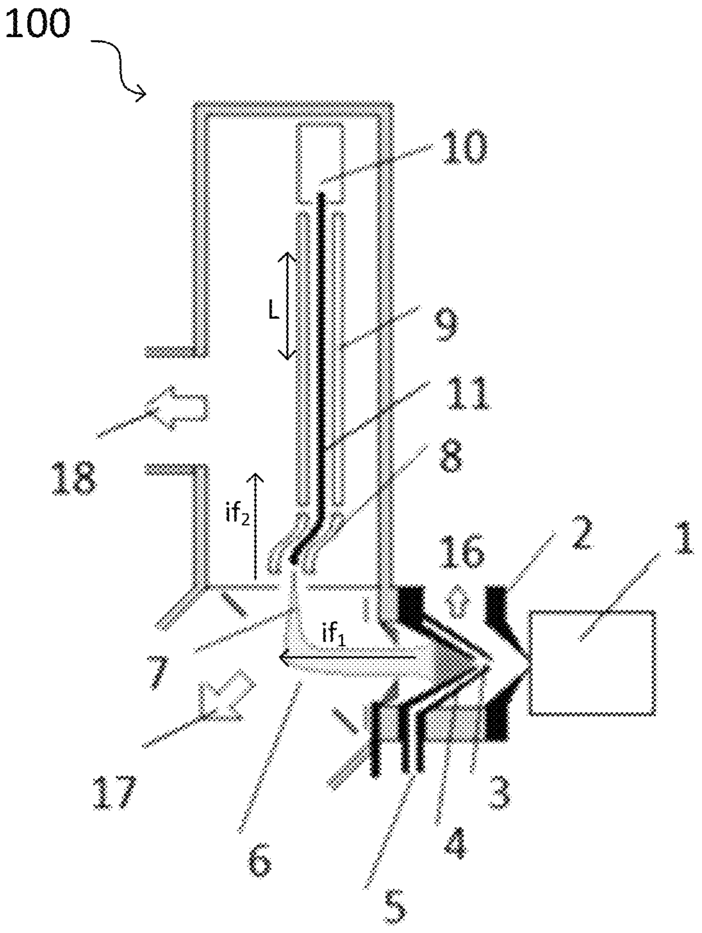
FIG. 1 shows a conventional quadrupole mass spectrometry device.

In FIG. 1, a conventional quadrupole based mass spectrometry apparatus 100 for analyzing an analyte sample is shown. The apparatus 100 comprises an ion source 1 from which a quantity of analyte ions from the analyte sample may be sourced for providing an initial ion beam 7. The apparatus 100 further comprises an interface arrangement for transferring the analyte sample into the analyzing part of the mass spectrometry device 1 including a sampling cone 2 and a skimmer cone 3. The skimmer cone has a skimmer cone body 4 and a passage 5 used for introducing the substance or mixture may, e.g., be such as described in U.S. Pat. No. 7,329,863 B2 and 7,119,330 B2. However, the presence of a passage 5 is optional and with no means necessary to realize the idea underlying the present disclosure.

The device 100 also includes at least one second guiding optics 6 arranged so as to divert the ion beam 7 provided by the ion source 1 flowing along a first initial flow direction $if_1$ to flow along to a second initial flow direction $if_2$. The two initial flow directions $if_1$, $if_2$ for the present embodiment are exemplarily orthogonal to each other, whereas the second initial flow direction $if_2$ is parallel to a longitudinal axis L of the mass analyzer 9, which here is embodied in the form of a quadrupole mass analyzer. Prior to mass analyzer 9, a brubaker prefilter 8 is arranged which guides the ion beam 11 into the mass analyzer 9. A detector unit 10 in the form of a quadrupole detector is arranged in an end region of the mass analyzer 9.

On its way towards the detector unit 10, the ion beam 7, 11 passes through different vacuum stages 16, 17, 18, and in case of FIGS. 2*a*, 2*b*, 3*a* and 3*b*, also 19.

The present disclosure now provides a mass spectrometry apparatus 100 in which two separate and independently and interleaved detector units A and B are combined. Without reducing the scope of protection to the specific embodiments included in the figures, the following figures relate to the case of a first detector unit A comprising a quadrupole detector 10 and a second detector unit B comprising a TOF detector 15, allowing to either perform a quadrupole or TOF based detection or both in a quasi-parallel manner. Mass analyzer 9 is exemplarily embodied in the form of a quadrupole mass analyzer preceded by a brubaker pre-filter 8, similar as in case of FIG. 1.

Figure 2A:
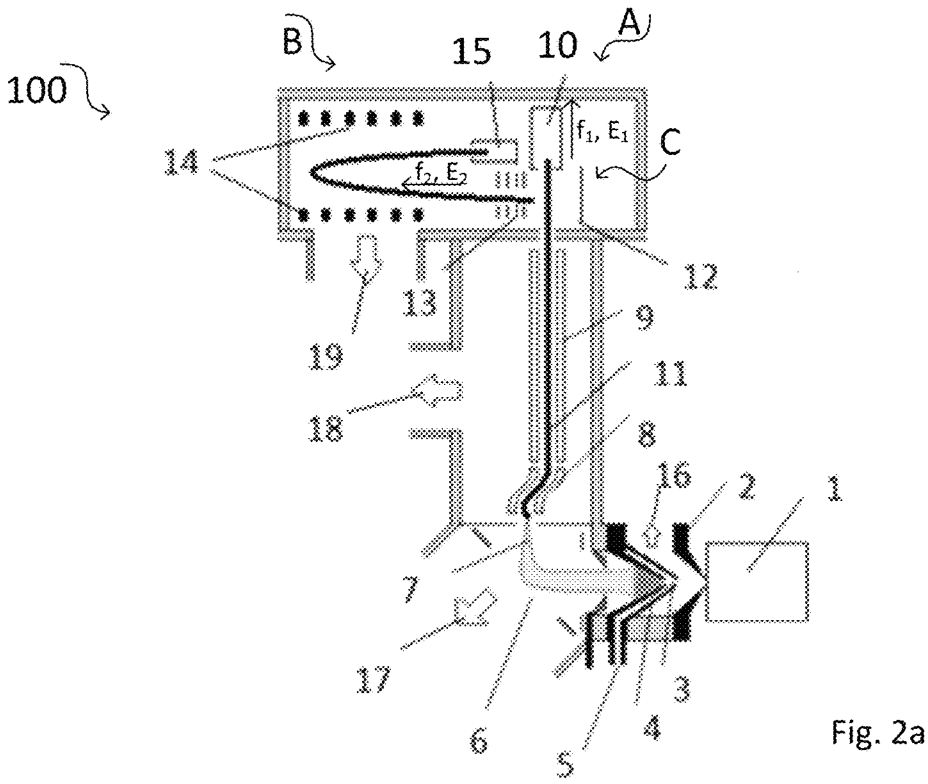
FIGS. 2*a* and 2*b* show different embodiments of an apparatus according to the present disclosure for which the first and second flow direction are orthogonal to each other.
Figure 2B:
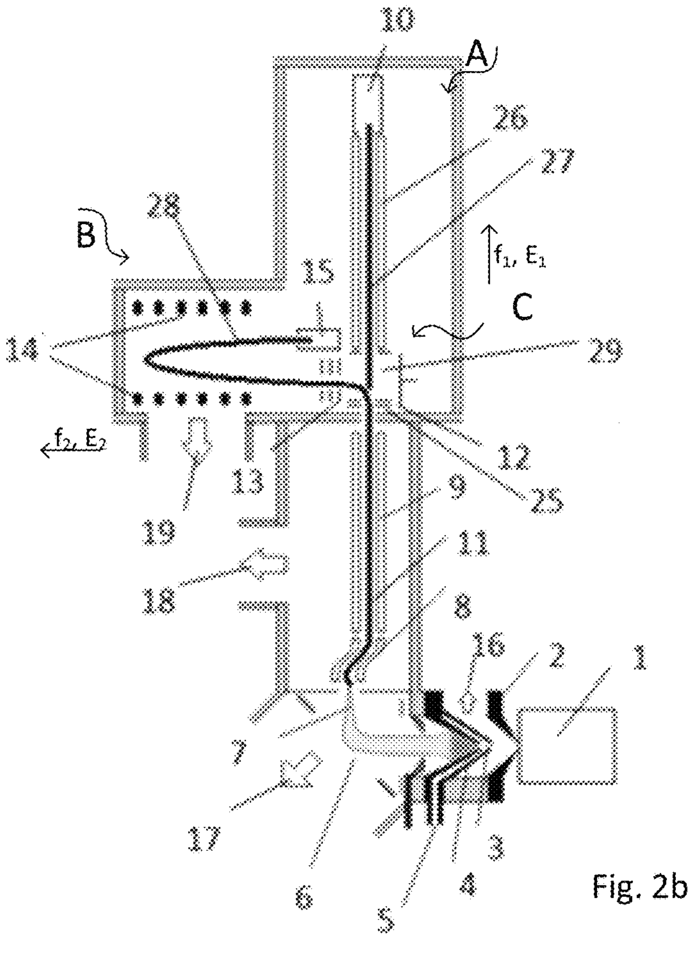

FIGS. 2*a* and 2*b* relate to embodiments for which the first A and second detector units B are arranged orthogonal to each other. The first detector unit A comprises a quadrupole detector 10 similar as in case of FIG. 1. The second detector unit B comprises an arrangement of push/pull-electrodes 13 to guide the ion beam 11, a TOF mass-analyzer 14 defining a reflection section and a TOF detector 15, which also can, e.g., be embodied in the form of a quadrupole detector, resulting in a second detector unit B in the form of a Q/TOF detector unit.

The first detector unit A is arranged parallel to a first plane $E_1$ and the second detector unit B is arranged parallel to a second plane $E_2$, the first and the second plane $E_1$, $E_2$ being orthogonal to each other. The first plane $E_1$ is parallel to the first initial flow direction $if_1$ and the longitudinal axis of mass analyzer 8.

For the embodiment shown in FIG. 2*a*, the apparatus 100 further comprises a first guiding optics C which comprises an electrode 12, serving to guide the ion beam 11 either in the first $f_1$ or second flow direction $f_2$. Such guiding optics c is not necessary for the present disclosure. Instead, a guidance of the ion beam 11 towards the first A and/or second detector unit B can also be achieved by other components of the apparatus 100, e.g., components of the first A and second detector unit B, as e.g., the push/pull-electrodes 13 shown in FIG. 2*a*. On the other hand, the guiding optics C can also comprise a multitude of different electron and/or lenses or also at least one ion mirror.

In contrast to FIG. 2*a*, the apparatus 100 shown in FIG. 2*b* comprises one mass analyzer 9, equivalent to the case of FIG. 1 or 2*a*, and an additional mass analyzer 26 arranged between the first mass analyzer 9 and the first detector 10. The ion beam 11 received from the first mass analyzer 9 passes a guiding optics C further including a first ion optics 25 to inject the ion beam 11 into region 29. From region 29, especially a push/pull region, the ions are either transferred into the second mass filter 26 as ion beam 27 being detected by the first detector unit A, or into the second detector unit B comprising the TOF mass analyzer 14 as ion beam 28.

Figure 3A:
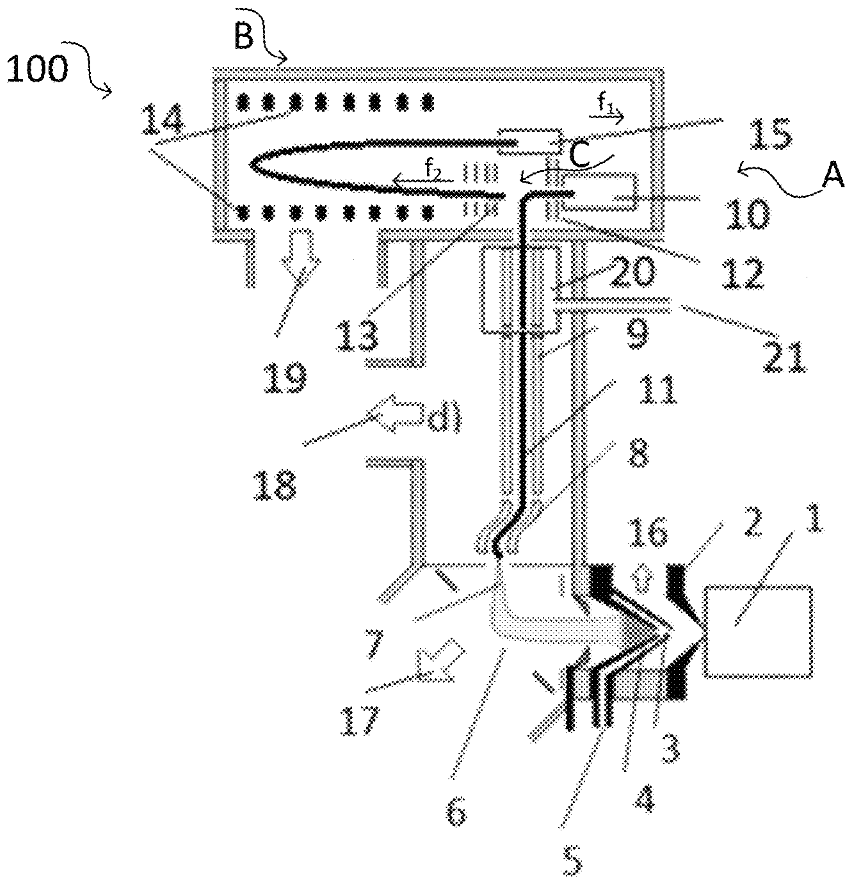
FIGS. 3*a* and 3*b* show different embodiments of an apparatus according to the present disclosure for which the first and second flow direction are antiparallel to each other.
Figure 3B:
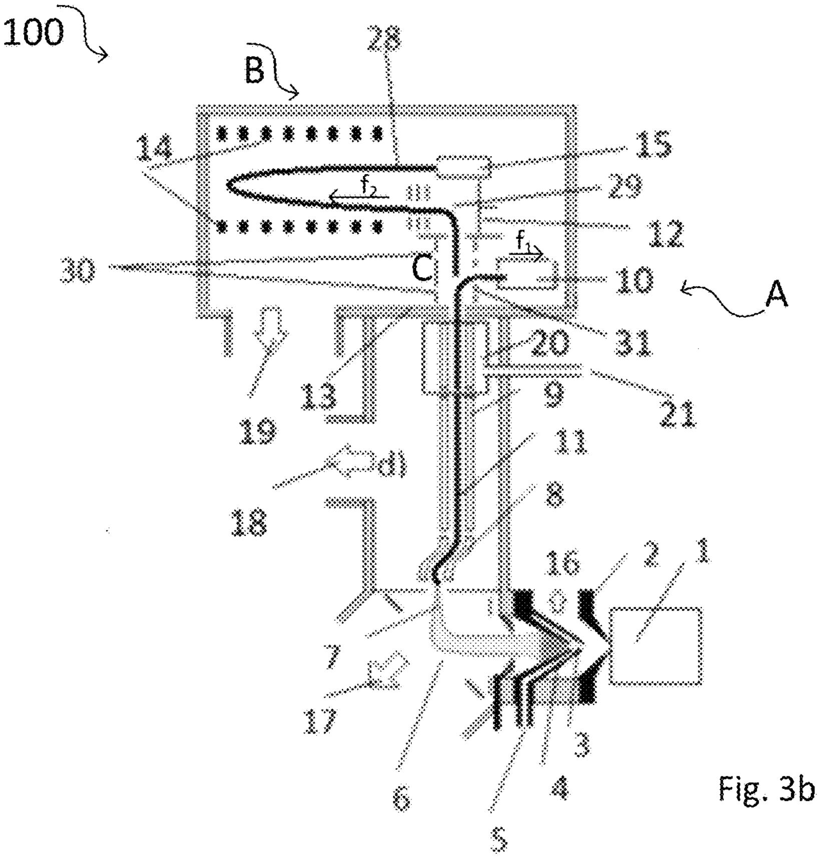

FIGS. 3*a* and 3*b* relate to embodiments of the apparatus 100 according to the present disclosure for which the first $f_1$ and second flow direction $f_2$ are antiparallel to each other. In addition to the devices 100 shown in FIGS. 1, 2*a* and 2*b*, the device 100 shown in FIG. 3*a* additionally includes an optional collisional cell 20 with gas control line 21 for controlled injection of a collisional or reactive gas or mixture of at least two gases. In contrast to the cases shown in FIGS. 2*a* and 2*b*, the first $f_1$ and second flow directions $f_2$ are antiparallel to each other in case of FIG. 3*a*.

The embodiment shown in FIG. 3*b* is similar to that shown in FIG. 3*a*. However, the guiding optics C here further includes ion optics 30 transferring ion beam 11 from the collisional cell 20 or mass analyzer 9 to region 29 and electrode arrangement 31 used to direct ions of the ion beam 8 into the first flow direction $f_1$ and thus, to the first detector unit 10, e.g., by applying a switching voltage.

Even though all preferred embodiments shown in the figures relate to a second detector unit B in the form of a Q/TOF detector unit, the present disclosure is with no means limited to such configuration of the second detector unit B. Similarly, the disclosure is also not limited towards a first detector unit A comprising a quadrupole detector.

However, for such cases, where a Q/TOF based device is combined with a quadrupole based device, the present disclosure enables to integrate the first detector unit A into an area including the push/pull region 29 of the TOF based second detector unit B such that the ions of the ion beam 11 received from mass analyzer 9 or collisional cell 20 are wither guided towards the first 10 or second detector 15. That way, costs to set up the combined device as well as its complexity can be highly reduced. In principle, the first detector unit A can be integrated into a TOF based second detector unit B without affecting its properties meaning that the properties of a quadrupole and TOF based device can be entirely maintained in the combined hybrid device 100.

It is an advantage of the present disclosure that within one single device 100 an interleaved recording of mass spectra with the first 10 or second 15 detector becomes possible, e.g., depending on the information to be obtained from the sample. For instance, after ionization (or atomization) of the sample a first Q/TOF based mass spectrum can be recorded to reveal overall mass range information of the dynamic range of ions contained in the sample. In one or more subsequent steps, quadrupole based mass spectra may be recorded to analyze low abundant ion populations or ions with very strict quantification demands. Both spectra may also be merged into a final spectrum. Another mode of operation can also start from an analysis based on the first detector unit a, i.e. a quadrupole based analysis, which then may trigger to also record a TOF based spectrum for advanced information or to obtain a preset decision tree for further proceeding. Yet, other possible modes of operation include to analyze different components of the sample with the two different detectors 10, 15, e.g., particles by the second detector 15 and homogeneously dissolved ingredients by the first detector 10, or isotope distribution patterns with the second detector and other targets using the first detector 10.

In summary, the apparatus 100 and method according to the present disclosure provide for several advantages over prior art devices: Mass spectra with a sensitivity and robustness equal to classical quadrupole based mass spectrometry devices can be recorded as well as a simultaneous acquisition of a spectrum relating to all elements contained in the sample. Different acquisition speeds, sensitivities and dynamic ranges of both a quadrupole and a TOF based device can advantageously be combined depending on the application, which also results in a higher overall measurement speed.

We claim:

1. A mass spectrometry apparatus for analyzing an analyte sample, the mass spectrometry apparatus comprising:

an ion source configured to generate a quantity of ions from the analyte sample as to provide an ion beam;

a mass analyzer configured to filter the ions of the ion beam based on mass-to-charge ratio of the ions;

a first detector unit configured to analyze the ions of the ion beam;

a second detector unit configured to operate on the time-of-flight principle and comprising a second detector configured to analyze the ions of the ion beam, wherein the first detector unit is arranged parallel to a first plane, and the second detector unit is arranged parallel to a second plane; and a first guiding optics arranged and/or configured as to direct the ion beam received from the mass analyzer in a first flow direction parallel to the first plane to the first detector unit and/or in a second flow direction parallel to the second plane to the second detector unit, wherein the first flow direction and the second flow direction are antiparallel to each other.

2. The mass spectrometry apparatus of claim 1, wherein the first detector unit includes a quadrupole detector.

3. The mass spectrometry apparatus of claim 1, wherein the second detector is a quadrupole time-of-flight (QTOF) detector.

4. The mass spectrometry apparatus of claim 1, wherein the mass analyzer is a quadrupole mass analyzer.

5. The mass spectrometry apparatus of claim 1, further comprising at least two mass analyzers.

6. The mass spectrometry apparatus of claim 1, wherein the first guiding optics comprises at least one electrode and/or a lens arrangement or an ion mirror.

7. The mass spectrometry apparatus of claim 1, wherein the mass spectrometry apparatus further comprises a switching means configured to switch at least one component of the first guiding optics between a first state, in which the ion beam is directed into the first flow direction, and a second state, in which the ion beam is directed into the second flow direction.

8. The mass spectrometry apparatus of claim 1, wherein the first guiding optics is arranged between the mass analyzer, the first detector unit and the second detector unit.

9. The mass spectrometry apparatus of claim 1, wherein the first plane is parallel to a longitudinal axis of the mass analyzer.

10. The mass spectrometry apparatus of claim 1, further comprising a collisional cell arranged between the mass analyzer, the first detector unit and second detector unit.

11. The mass spectrometry apparatus of claim 1, further comprising a second guiding optics arranged as to divert the ion beam from the ion source flowing along a first initial flow direction to flow along to a second initial flow direction, wherein the initial first direction and second initial flow direction are orthogonal to each other as to minimize an effective footprint of the mass spectrometry apparatus.

12. The mass spectrometry apparatus of claim 1, further comprising a second guiding optics arranged as to divert the ion beam from the ion source flowing along a first initial flow direction to flow along to a second initial flow direction, wherein the initial first direction and second initial flow direction are antiparallel to each other as to minimize an effective footprint of the mass spectrometry apparatus.

13. A method for analyzing an analyte sample using the mass spectrometry apparatus according to claim 1, the method comprising:

recording a first mass spectrum with the first detector unit;

recording a second mass spectrum with the second detector unit; and analyzing the first mass spectrum and second mass spectrum.

14. The method of claim 13, wherein the analyzing of the first and second mass spectra includes combining the first and second mass spectra.

* * * * *